Patented Dec. 3, 1929

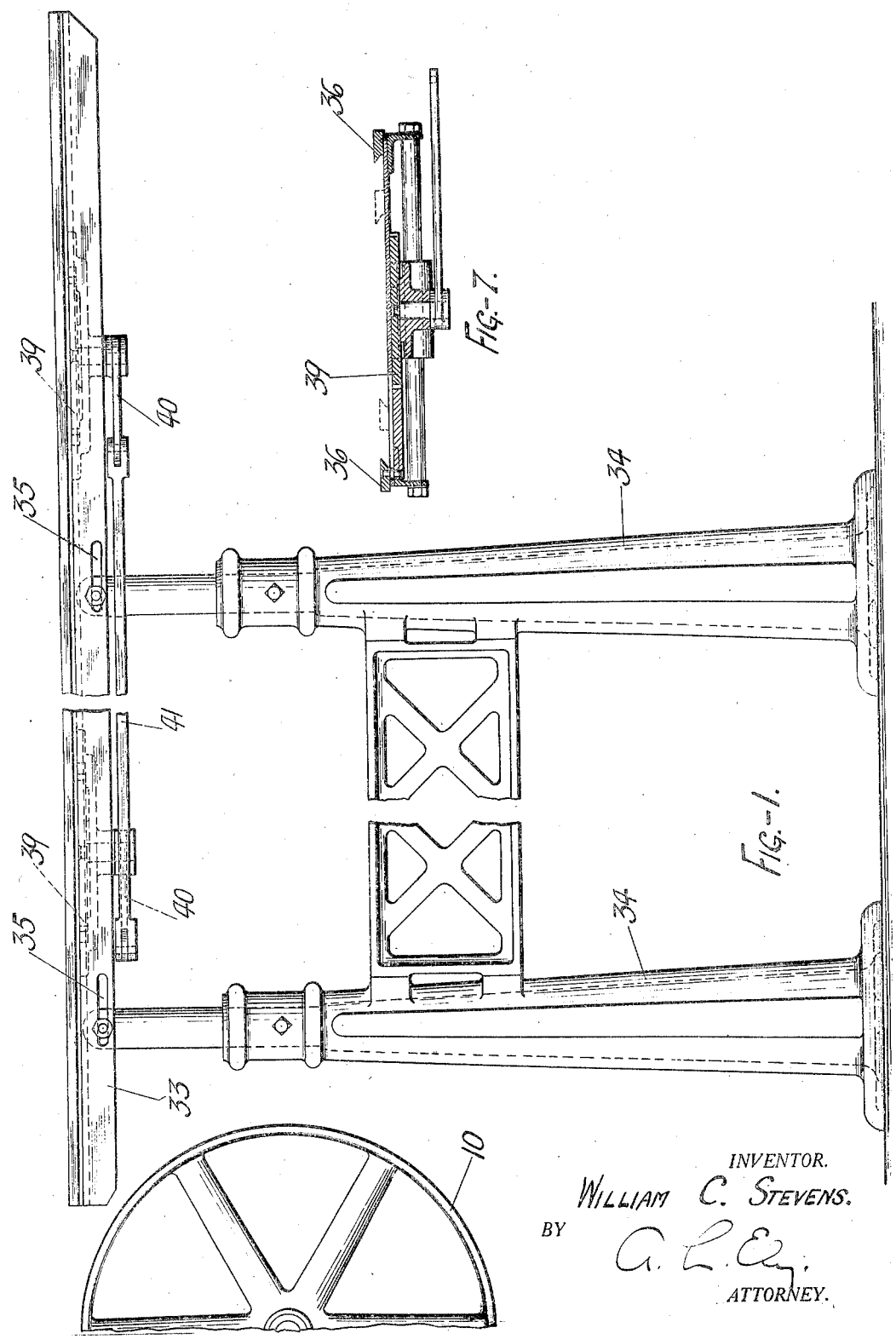

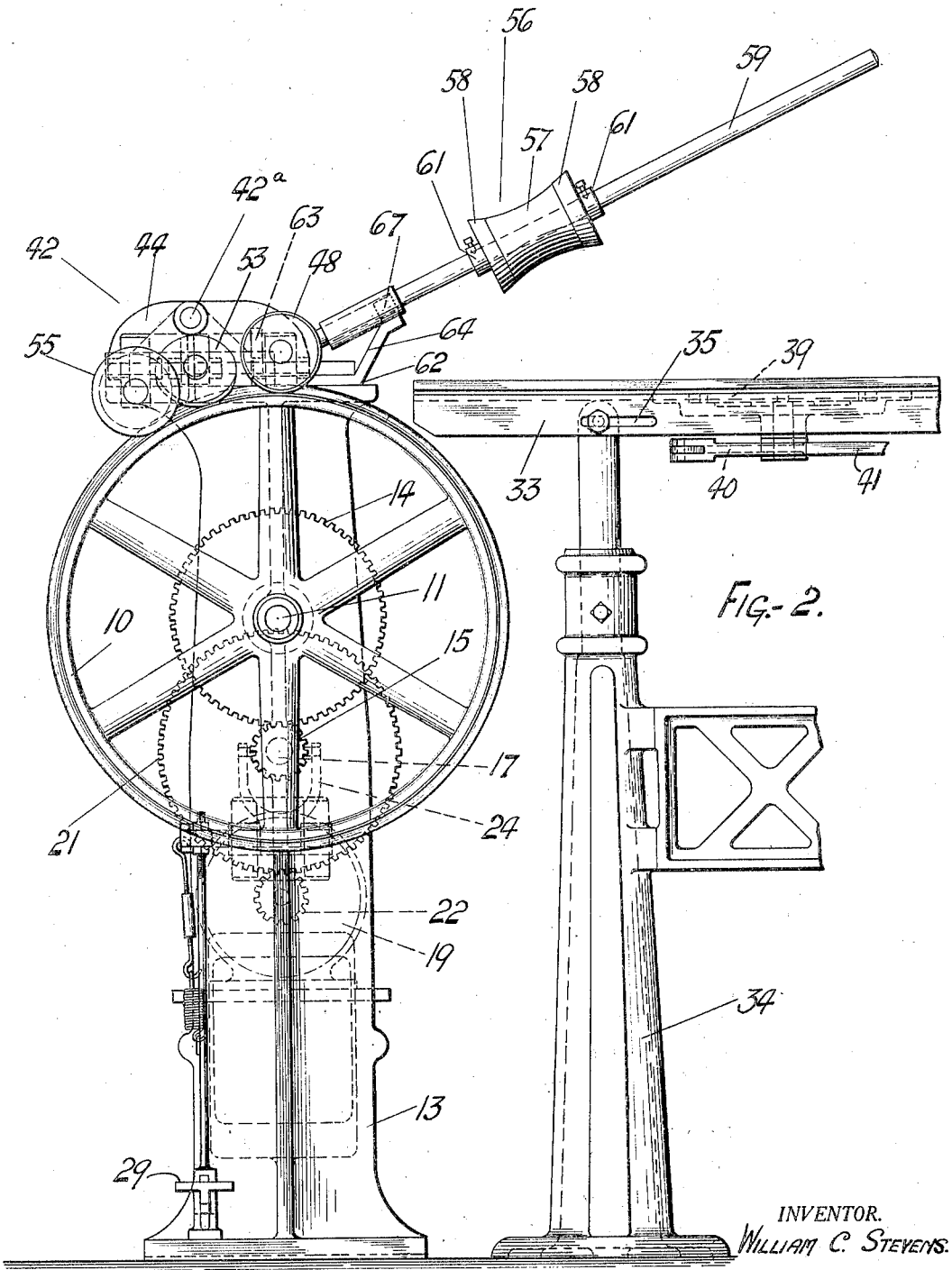

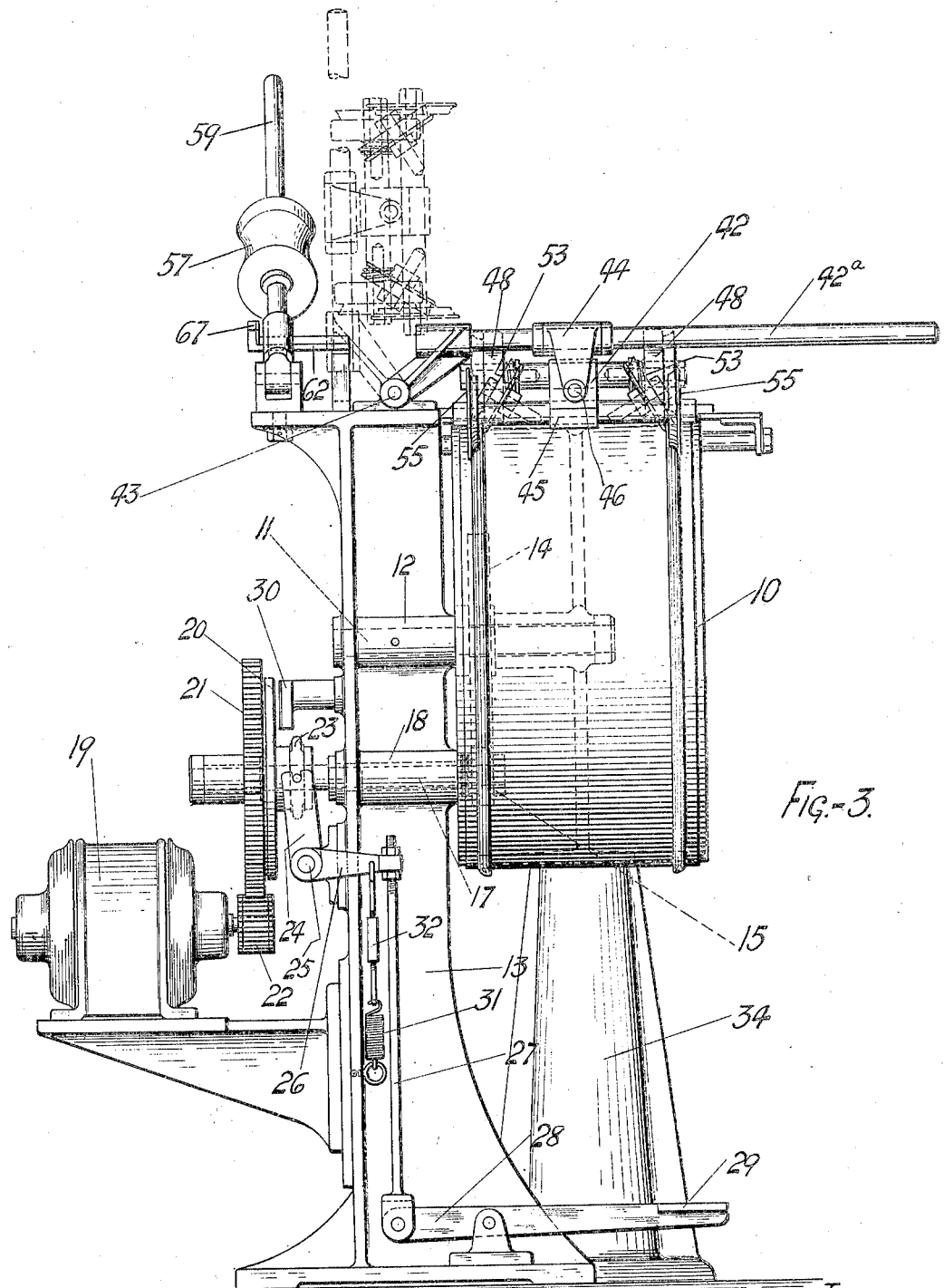

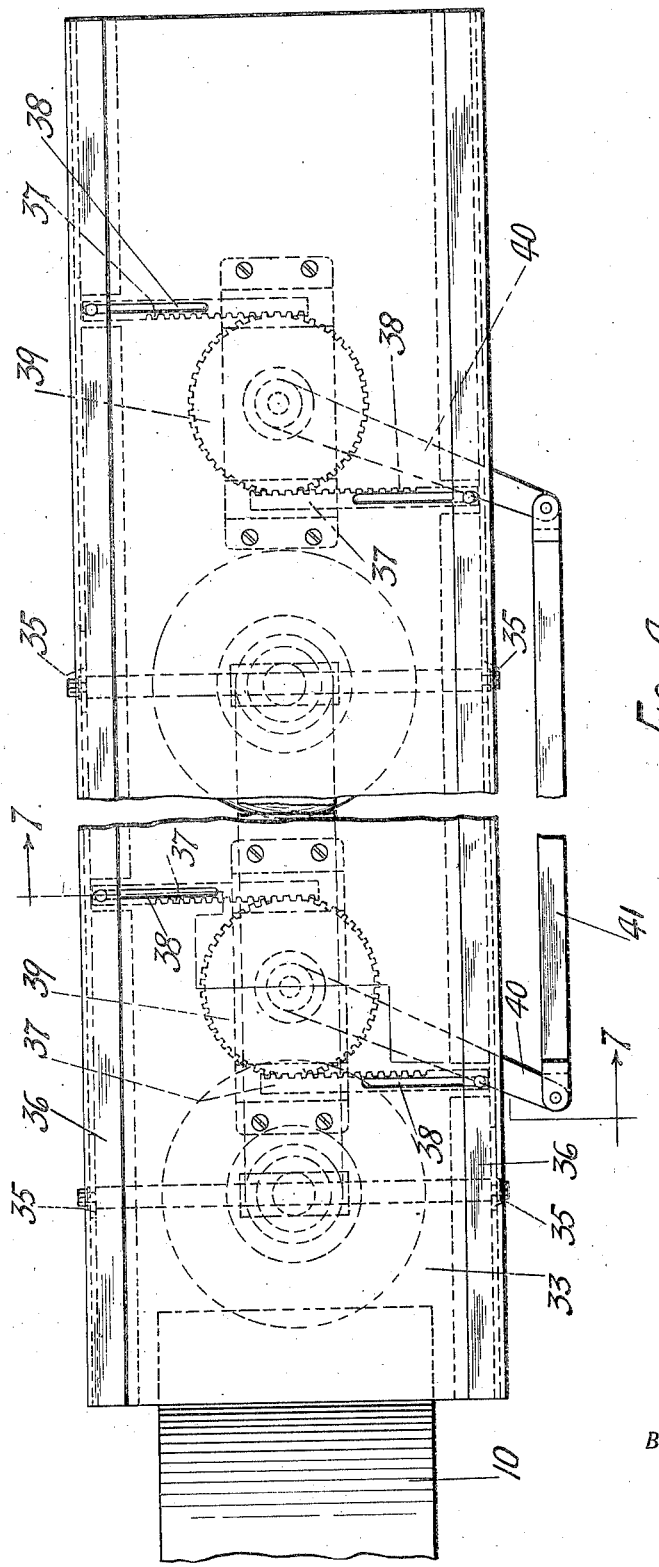

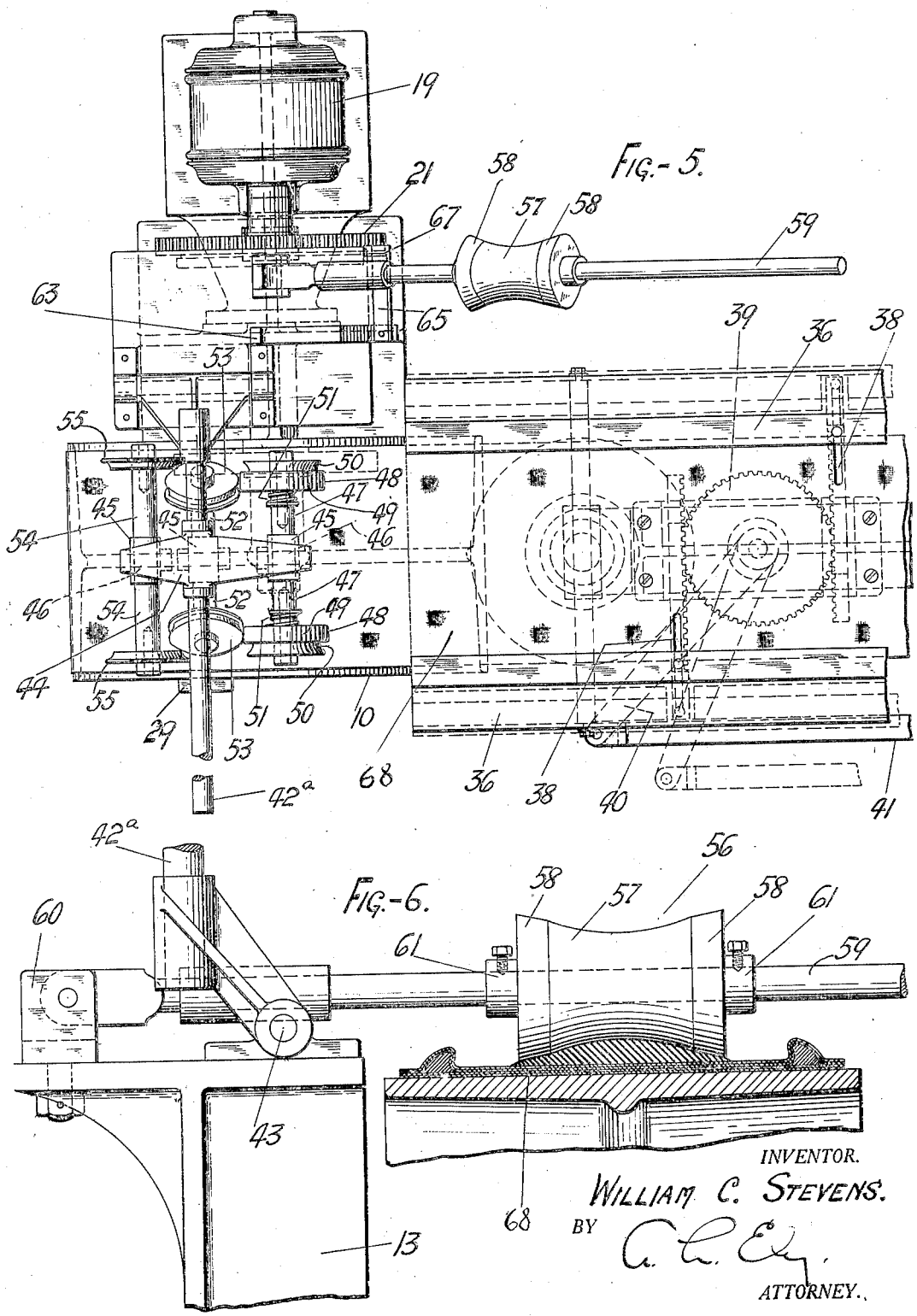

1,738,503

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

FLAT-BAND-TIRE BUILDING MACHINE

Application filed December 19, 1924. Serial No. 756,956.

This invention relates to machines for building flat band tires, that is, tires which are initially formed as an endless transversely flat band which is subsequently shaped and expanded to normal tire shape in which it is subsequently cured.

The purpose of the invention, in general, is to provide a simple, effective but inexpensive apparatus for quickly making the flat bands from which the tires are subsequently formed. Particularly the invention contemplates a construction including a rotary drum on which the tire is built and simple, quick-operating means to facilitate feeding rubberized fabric plies onto the drum and centering them properly on the surface thereof.

An important object of the invention is to provide improved stitching devices operable on the drum to stitch into place the various parts of the tire including the beads, the fabric plies about the beads, and the tread.

The foregoing and other objects are realized in the construction described below and illustrated in the accompanying drawings, it being understood, however, that the invention is not limited to the specific form thereof described and shown.

Of the accompanying drawings:

Figure 1 is a side elevation, partly broken away illustrating a portion of the machine;

Figure 2 is a side elevation illustrating the remainder of the machine;

Figure 3 is a front elevation of the machine;

Figure 4 is a plan of the portion of the machine shown in Figure 1;

Figure 5 is a plan of the portion illustrated in Figure 2, and shows the manner in which fabric is laid onto the drum;

Figure 6 is a detail front elevation illustrating the manner of stitching a tread in place on a tire; and Figure 7 is a section on line 7—7 of Figure 4.

In the drawings, 10 represents a building drum formed with a wide, transversely, flat peripheral surface on which the tire is to be built. The drum 10 is secured on a shaft 11 journaled in a bearing 12 formed in a standard 13. Secured on shaft 11 is a gear 14 meshed with a pinion 15 which latter is secured on a shaft 17 journaled at 18 in standard 13. Shaft 17 is adapted to be clutched to a motor 19, mounted on standard 13, by having keyed or splined thereon a shiftable friction disk 20, arranged to frictionally engage a rotating gear 21 which is continuously rotated by a pinion 22 on the rotor shaft of motor 19. For shifting disk 20, the usual collar 23 is employed and is adapted to be shifted by the yoke 24 which is pivoted on standard 13 at 25 and is operable on its pivot by an arm 26. Arm 26 is connected by a rod 27 to a lever 28 pivoted on standard 13 and having a treadle 29 thereon. To quickly stop rotation of drum 10 as the clutch disk 20 is shifted out of engagement with gear 21, a brake shoe 30 is secured on standard 13 so as to be engaged by said disk as the latter is urged away from gear 21 by a tensile spring 31 which is connected at one end to standard 13 and at the other by a turn-buckle 32 to arm 26.

Arranged so as to facilitate the feeding of stock onto drum 10, there is provided a stock feeding table 33 supported on standards 34, 34 and adjustable toward or from drum 10 in any suitable manner as indicated at 35, 35 so as to extend tangentially of the upper surface of the drum and in overhanging relationship to the drum. To the end that the stock will properly be centered on the drum as it is drawn from the surface of table 33, a pair of guide rails 36, 36 are arranged to slide over the surface of the table toward or from each other to vary the distance between them. The rails 36 are undercut, as shown in Figure 7, so as to hold the stock between the rails.

Any suitable apparatus may be employed to adjust the rails 36 or to secure them in adjusted positions. The preferred form of apparatus is that clearly illustrated in Figure 4 and includes racks 37, 37 arranged to slide beneath the surface of the table 33 and connected through slots 38, 38 to the rails 36. Racks 37 mesh with gears 39, 39 journaled onto the under-surface of the table and arranged to be rotated in either direction by levers 40, 40 which extend outwardly from the table to one side thereof and are connected together by an operating bar 41.

After the beads have been applied and spliced onto a number of plies on the drum 10 and an additional number of plies are laid on the drum over the beads, it is necessary that the latter plies be stitched about the beads. To this end a stitcher unit 42 is mounted on an arm 42ª so as to be carried to or from engagement with the surface of the drum. Arm 42 is pivoted at 43 (Figure 3) on standard 13 and is arranged to be swung from the dotted line position shown in Figure 3 to the full line position shown therein. A stitcher carrying bracket 44 is adjustable along arm 42ª and has secured so as to be angularly adjustable thereon, a plurality, in this instance, three similar brackets 45, 45 pivoted to bracket 44 at 46, 46. One bracket 45 is formed with laterally extending spindles 47, 47 on which is journaled a pair of stitcher rollers 48, 48 formed with transversely flat portions 49 for stitching the marginal portions of the fabric plies adjacent the inner edges of the beads and with a groove 50 of the profile to fit over the upper surface of a bead on the drum to stitch them in place and also to stitch the outer fabric plies thereover.

The rollers 48 are adapted to yield inwardly toward each other by being slidable on the spindle 47 against the action of compression springs 51, 51.

The next bracket 45 has angularly directed spindles 52, 52 formed so as to extend outwardly and upwardly therefrom (when in stitching position) and having journaled thereon a pair of rollers 53, 53 formed with a peripheral groove of such profile as to fit the "heel" of the bead on the drum to stitch the bead in place and also to stitch the outer fabric plies snugly about the heel of the bead.

The third bracket 45 is provided with laterally extending spindles 54, 54 on which are journaled a pair of rollers 55, 55 formed with a peripheral profile adapted to fit over the "toe" or outer upper surface of the beads to stitch the beads in place on the drum and to stitch the outer fabric plies snugly about the toe of the bead and onto the inner plies lying beneath the beads on the surface of the drum. As best shown in Figure 2, the various sets of stitcher rollers are arranged on an arc concentric with the drum surface in such relation that their peripheries will engage the surface of the drum when the unit is moved into engagement therewith.

For stitching a tread onto a carcass built on the drum 10, a tread stitcher 56 formed of a roller 57 of yielding material, such as rubber and rollers 58, 58 on either side of rollers 57 of hard material, such as metal, fibre, etc., are journaled onto a lever 59 which latter is pivoted on a swiveled bracket 60 journaled on standard 13. Rollers 57 and 58, in cooperation, provide a peripherial groove of a shape adapted to fit the outer surface of the tread stock (Figure 6). The rollers 57 and 58 are retained in place so as to be movable into position over the center of drum 10 by collars 61, 61 secured on the lever. Lever 59 is arranged to travel on a supporting and guiding rail 62 so formed as to provide a stop 63 for properly positioning the stitcher 56 with respect to the drum and with an inclined portion 64 and a backwardly extending portion 65 over which the lever is adapted to ride to a position out of the path of stitcher unit 42 and also out of the path of the fabric passing from table 33 onto the drum. The rail 62 is also formed with a stop 67 for limiting movement of the lever 59 backwardly on the portion 65 of the rail.

In operation, plies of fabric, indicated at 68, 68 are placed on the surface of table 33 between guider rails 36 which are then moved together by operating bar 41 forwardly of table 33 to shift the fabric plies to the center of the table, the rails 36 being in engagement with the edges of the plies. The plies are then drawn by the operator onto the surface of drum 19, which is rotated by depressing treadle 29, the operator slightly pressing the plies onto the drum as they pass thereon by resting the palm of the hand on the plies. After a determinate number of plies have been applied to the drum, bead strips are guided thereon from reels thereof by any suitable guiding means (not shown). The beads are cut from the strips and spliced in any suitable manner on the drum. Stitcher unit 42 is then swung onto the drum, the latter being rapidly rotated and the beads stitched into place. Additional fabric plies are laid over the beads in a similar manner to the first plies, and stitcher unit 42 is again actuated onto the surface of the drum which is again rapidly rotated, the additional plies being thus stitched snugly over the beads.

A composite strip of tread stock which includes the cushion gum and breaker strip and is previously cut to length is then fed from table 33 onto the drum, the ends being spliced together thereon by a hand stitcher. The tread stitcher 56 is then swung on guide rail 62 against stop 63 and is pressed by the operator onto the tread to stitch it onto the carcass while the drum is rotating. The marginal edges of the fabric plies are then folded upwardly about the beads by a suitable hand tool, (not shown) the drum being again rotated as will be understood, and the flat band thus formed is stripped from the drum and transported to finishing machines for application of side walls and bead-chafer strips thereto.

Modifications of the invention may be resorted to without departing from the spirit thereof or the scope of the appended claims.

What is claimed is:

1. In combination, a rotatable drum, a table for receiving plies of material to be wrapped on the drum, said table overhanging the drum and extending tangentially of its upper surface, and means on the table for guiding the plies into proper position on the drum, said means comprising a pair of guide rails movable toward and from each other on the surface of the table, means for simultaneously moving the rails toward and from each other into engagement with the edges of the plies, and a stitcher device movable onto the upper surface of the drum and cooperating therewith to draw the material from the table.

2. In combination, a rotatable drum, a table for receiving plies of material to be wrapped on the drum, said table overhanging the drum and extending tangentially of its upper surface, means on the table for guiding the plies into proper position on the drum, said means comprising a pair of guide rails movable toward and from each other on the surface of the table, and a stitcher device movable onto the upper surface of the drum and cooperating therewith to draw the material from the table.

3. In combination, a roatatable drum, a table for receiving plies of material to be wrapped on the drum, said table overhanging the drum and extending tangentically of its upper surface, means on the table for guiding the plies into proper position on the drum, and a stitcher device movable onto the upper surface of the drum and cooperating therewith to draw the material from the table.

4. In combination, a rotatable drum, means for supporting strip material in flat condition in overhanging relationship and at a tangent to the drum so as to be drawn therefrom and wrapped onto the surface of the drum, said means including devices for centering the strip with respect to the drum, and a stitcher device movable onto the upper surface of the drum and cooperating therewith to draw the material from its supporting means.

5. In combination, a rotatable drum, means for supporting strip material in flap condition in overhanging relationship and at a tangent to the drum so as to be drawn therefrom and wrapped on the surface of the drum, said means including a pair of guide rails movable toward and from each other for centering the strip with respect to the drum, and a stitcher device movable onto the upper surface of the drum and cooperating therewith to draw the material from its supporting means.

6. A stock feeding table for use in tire building machines comprising a top plate, a pair of guides movable toward and from each other on the top plate, a pair of racks connected to each guide, gears meshing with racks on opposite guides, arms secured onto the gears, and a bar connecting the arms together.

7. In combination, a rotatable drum, a stock guiding table directed tangentially of the upper periphery of the drum, and a stitcher unit pivoted to swing onto the upper surface of said drum, said unit comprising pairs of spaced rollers including a pair, the outer profiles of which are such that they will fit the outer surfaces of spaced bead strips on the drum, a second pair so arranged and having outer profiles such that they will fit about the heels of the beads and a third pair having outer profiles such that they will fit about the toes of beads, the several pairs of rollers being arranged on an arc concentric with the periphery of said drum.

8. In a combination, a rotatable drum, a stock guiding table directed tangentially of the upper periphery of the drum, and a stitcher unit pivoted to swing onto the upper surface of said drum, said unit comprising pairs of spaced rollers including a pair, the outer profiles of which are such that they will fit the outer surfaces of spaced bead strips on the drum, a second pair so arranged and having outer profiles such that they will fit about the heels of the beads and a third pair having outer profiles such that they will fit about the toes of the beads.

9. In combination, a rotatable drum, a stock guiding table directed tangentially of the upper periphery of the drum, two stitcher units movable onto the upper peripheral portion of said drum, one of said units being movable in one direction and the other unit being movable in two directions so as not to obstruct movement of the first unit.

10. In combination, a rotatable drum, a stock guiding table directed tangentially of the upper periphery of the drum, and a tread stitcher movable onto the upper surface of said drum, said stitcher including a roller of yielding material shaped to fit the surface of the tread.

11. In combination, a rotatable drum, a stock guiding table directed tangentially of the upper periphery of the drum, and a tread stitcher movable onto the upper surface of said drum, said stitcher including a roller of yielding material for engagement which body portion of the tread, and rollers of hard material for engaging the marginal portions of the tread.

12. In combination, a rotatable drum, a table directed tangentially of the upper surface of the drum, a tread stitcher carried on an arm pivoted on a swiveled bracket so as to be movable over the drum onto the upper surface thereof, and a supporting and guiding rail on which the arm is arranged to travel.

13. In combination, a rotatable drum, a table directed tangentially of the upper surface of the drum, a tread stitcher carried on an arm pivoted on a swiveled bracket so as to be movable over the drum onto the upper surface thereof, and a supporting and guiding rail on which the arm is arranged to travel, and a stop for engaging the arm to position the stitcher properly with respect to the drum.

14. In combination, a rotatable drum, a table directed tangentially of the upper surface of the drum, a tread stitcher carried on an arm pivoted on a swiveled bracket so as to be movable over the drum onto the upper surface thereof, and a supporting and guiding rail on which the arm is arranged to travel, and stops for engaging the arm to position the stitcher properly with respect to the drum and for engaging the arm to prevent its movement off the rail when moved to a position away from the drum.

WILLIAM C. STEVENS.